United States Patent
Breuer et al.

(10) Patent No.: US 11,991,652 B2
(45) Date of Patent: May 21, 2024

(54) METHOD FOR POWER OPTIMIZED DATA TRANSMISSION IN A WIRELESS CELLULAR NETWORK

(71) Applicant: Telit Cinterion Deutschland GmbH, Munich (DE)

(72) Inventors: Volker Breuer, Botzow (DE); Florian Denzin, Berlin (DE); Lars Wehmeier, Falkensee (DE); Uwe Dummann, Panketal (DE)

(73) Assignee: Telit Cinterion Deutschland GmbH, Munich (DE)

( * ) Notice: Subject to any disclaimer, the term of this patent is extended or adjusted under 35 U.S.C. 154(b) by 359 days.

(21) Appl. No.: 17/294,094

(22) PCT Filed: Nov. 13, 2019

(86) PCT No.: PCT/EP2019/081113
§ 371 (c)(1),
(2) Date: May 14, 2021

(87) PCT Pub. No.: WO2020/099456
PCT Pub. Date: May 22, 2020

(65) Prior Publication Data
US 2022/0015046 A1    Jan. 13, 2022

(30) Foreign Application Priority Data
Nov. 15, 2018    (EP) ...................... 18206523

(51) Int. Cl.
*H04W 56/00*        (2009.01)
*H04W 12/033*       (2021.01)
(Continued)

(52) U.S. Cl.
CPC ....... *H04W 56/001* (2013.01); *H04W 12/033* (2021.01); *H04W 52/0212* (2013.01);
(Continued)

(58) Field of Classification Search
CPC .......... H04W 12/033; H04W 52/0212; H04W 56/001; H04W 76/14; H04W 88/04; H04W 92/18; Y02D 30/70
See application file for complete search history.

(56) References Cited

U.S. PATENT DOCUMENTS

| | | | |
|---|---|---|---|
| 2014/0009873 A1 | 1/2014 | Nashner et al. | |
| 2014/0098731 A1 | 4/2014 | Maaref et al. | |

(Continued)

FOREIGN PATENT DOCUMENTS

| | | |
|---|---|---|
| JP | 2013520128 | 5/2013 |
| KR | 1020170137708 A | 12/2017 |

(Continued)

OTHER PUBLICATIONS

International Search Report (PCT/ISA/210) with translation and Written Opinion (PCT/ISA/237) mailed on Dec. 10, 2019, by the European Patent Office as the International Searching Authority for International Application No. PCT/EP2019/081113.

(Continued)

*Primary Examiner* — Mansour Oveissi
(74) *Attorney, Agent, or Firm* — Pearl Cohen Zedek; LATZER BARATZ LLP

(57) ABSTRACT

The present invention relates to a method for data transmission from a first user equipment to a base station of a cellular network, where the first user equipment is camping on under coverage enhancement conditions, the first user equipment being communicatively connected to at least one second user equipment via a device-to-device communication channel, wherein for the data transmission of at least one data packet, the method comprises the steps for the first user equipment of: transmitting the at least one data packet to the at least one second user equipment via the device-to-device communication channel, instructing the at least one second user equipment to transmit the at least one data packet (Continued)

time-synchronized with the first transmission to the base station.

11 Claims, 4 Drawing Sheets

(51) Int. Cl.
    *H04W 52/02*     (2009.01)
    *H04W 76/14*     (2018.01)
    *H04W 88/04*     (2009.01)
    *H04W 92/18*     (2009.01)

(52) U.S. Cl.
    CPC ........... *H04W 76/14* (2018.02); *H04W 88/04* (2013.01); *H04W 92/18* (2013.01)

(56) References Cited

U.S. PATENT DOCUMENTS

| | | |
|---|---|---|
| 2015/0208440 A1 | 7/2015 | Agiwal et al. |
| 2016/0192420 A1 | 6/2016 | Kim et al. |
| 2018/0160298 A1* | 6/2018 | Wang ................... H04M 7/006 |
| 2018/0376535 A1 | 12/2018 | Cashman et al. |
| 2019/0037616 A1 | 1/2019 | Zhang |
| 2020/0068457 A1* | 2/2020 | You ....................... H04L 1/0026 |
| 2020/0288535 A1 | 9/2020 | Sharma et al. |
| 2020/0296745 A1 | 9/2020 | Inokuchi et al. |

FOREIGN PATENT DOCUMENTS

| | | |
|---|---|---|
| WO | WO2012057547 A2 | 5/2012 |
| WO | 2017119219 A1 | 7/2017 |
| WO | 2017159451 A1 | 9/2017 |
| WO | 2017163543 A1 | 9/2017 |
| WO | 2017166151 A1 | 10/2017 |
| WO | WO2018/173805 | 9/2018 |

OTHER PUBLICATIONS

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", Technical Report; 3GPP TR 36.746, vol. RAN WG2, No. V15.1.1, Apr. 15, 2018, pp. 1-55.

Fujitsu, "Discussion on the Method for Reducing Energy of Remote IoT Ue", 3GPP Draft; R1-1704475 FED2D Replay Based Remote IoT Final, vol. RAN WG1, No. Spokane, USA; Apr. 3, 2017-Apr. 7, 2017, Apr. 2, 2017, retrieved from the internet: http://www.3gpp.org/ftp/Meetings_3GPP_SYNC/RAN1/Docs/ (4 pages).

Lenovo, et al., "Discussion on Communication and UE-to-NW relaying aspects", 3GPP Draft; R-1705657, vol. RAN WG1, No. Spokane, USA; Apr. 3, 2017-Apr. 7, 2017, Apr. 2, 2017, XP051243778, retrieved from the internet: http://www.3gpp.org/ftp/Meetings_3GPP_SYNG/RAN1/Docs/ (4 pages).

Examination Report for co-pending Patent Application in Korea N°10-2021-7014593 and English translation.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15).

Examination Report from JP Patent Office for co-pending patent Application N°2021-526699 and English translation (8 pages).

Office Action received in EP Application No. 19 804 701.1 dated Sep. 20, 2023.

Qualcomm, Way forward for LPIR [online], 3GPP TSG-SA WG1 Meeting #80 S1-174583, Internet URL:http://www.3gpp.org/ftp/tsg_sa/WG1_Serv/TSGS1_80_Reno/Docs/S1-174583.zip; Dec. 1, 2017.

* cited by examiner

METHOD FOR POWER OPTIMIZED DATA TRANSMISSION IN A WIRELESS CELLULAR NETWORK

CROSS-REFERENCE TO RELATED APPLICATIONS

This application is a National Phase Application of PCT International Application No. PCT/EP2019/081113, International Filing Date Nov. 13, 2019, claiming priority to European Patent Application No. 18206523.5, filed Nov. 15, 2018, which are hereby incorporated by reference.

FIELD OF THE INVENTION

The present invention relates to a method for data transmission from a user equipment in a cellular network. The invention also pertains to a user equipment using said method.

Present invention further relates to a method for operating a base station. The invention also pertains to a base station using said method.

BACKGROUND OF THE INVENTION

In the field of wireless communication the cellular networks further evolve to diversify the ways of communication, in particular for covering the wide variety of communication use cases. This represents the newest challenges that the so-called Internet of thinks (IoT) causes for network operators. The challenges in particular apply to low-capability and effectively low-cost user end devices. These pose challenges as they want to get a minimum service, in bad conditions with low power consumption. And of course the service shall be inexpensive.

One of such use cases is the improved and reliable data transmission for one user equipment out of a group of user equipments operated in the field. The group of user equipments are capable of communicating with each other, at least some of them, via device-to-device communication, like the PC5/sidelink channel introduced with LTE.

Often it is the case that such user equipments are operating, in particular stationary, in an area with bad network coverage.

For a user equipment in such situation it is by now possible to communicate in coverage enhancement mode, that is to repeat the transmissions many times until at the receiver, in particular the base station, sufficient signal strength was accumulated in order to decode the transmission. This coverage enhancement can improve the coverage conditions by up to 15-18 dB, however the accumulation over time is rather non-linear. I.E. with two repetitions roundabout 3 dB can be achieved, but to get 18 dB up to 2048 repetitions are needed.

However, the necessity to repeat the transmissions 100 times or more obviously leads to a delay of data transmission. When a plurality of user equipments of a group want to transmit their data, they might have to wait until the data are transmitted. Moreover during this transmission times the corresponding cellular network resources are blocked for all other user equipments.

Further this way of transmission increases the power consumption for a user equipment. For user equipments operated with a battery this could reduce the lifetime of the battery.

By now for such groups it is known that one user equipment receives via sidelink the transmissions from the other user equipments of the group and transmits the data to the cellular network. The disadvantage is, that this one user equipment consumes much more battery power than the other ones. Consequently it needs to be equipped with additional resources, in order to fulfil the tasks of being an "aggregator" user equipment. As a matter of fact it may be that after installation, in particular stationary installation, another user equipment is operating in better coverage condition, but not sufficiently equipped with battery power. Hence the aggregator user equipment takes the task but has worse coverage conditions and so the data transmission, in particular when enhanced coverage transmission is needed, will take very long and is not flexible.

It is therefore the goal of present invention to overcome the mentioned disadvantages and to propose a solution for an improved and flexible data transmission procedure for a group of user equipments operating in bad coverage conditions of a cellular network.

Further alternative and advantageous solutions would, accordingly, be desirable in the art.

SUMMARY OF THE INVENTION

In a first aspect, the invention is embodied as a method for data transmission from a first user equipment to a base station. In a second aspect, the invention is embodied as a user equipment. According to a third aspect, the invention is embodied as a method for operating a base station. A fourth aspect of the invention pertains to a base station.

According to the first aspect of the invention it is proposed a method for data transmission from a first user equipment to a base station of a cellular network, where the first user equipment is camping on under coverage enhancement conditions, the first user equipment being communicatively connected to at least one second user equipment via a device-to-device communication channel, wherein for the data transmission of at least one data packet, the method comprises the steps for the first user equipment of:

transmitting the at least one data packet to the at least one second user equipment via the device-to-device communication channel, instructing the at least one second user equipment to transmit the at least one data packet time-synchronized with the first transmission to the base station.

The inventive method relates to a user equipment being capable of operating with a base station of a cellular network for wireless communication, in particular those implementing the wireless technology standards of 4G (LTE), 5G (New Radio) or beyond.

As a matter of fact the user equipment has the capability to operate in bad coverage conditions, by means of enhanced coverage mode, resp. in coverage enhancement conditions.

As part of the 3GPP Release 13 definition it was introduced the so-called coverage enhancement (CE) mode. This solves reception/coverage issues by allowing communication that way that by many repetitive receptions of the same data packets the receiver aggregates sufficient power until the data packets can be reliably read from the receiver. A precondition for that is that the base station supports CE user equipments The enhanced coverage support is performed up to a certain coverage enhancement limit which is also indicated by the base station, i.e. corresponding to the maximum of repetitions and resources a base station would spend for a user to achieve a certain coverage enhancement depth.

Obviously the amount of repetitions for transmitting a data packet leads to a higher power consumption. On the other hand, for a couple of machine-type communication (MTC) resp. Internet of Things (IoT) applications like metering devices a given power consumption budget is predefined which is in slightly worse coverage conditions hard to keep.

Here comes the inventive method into play for the situation of at least two user equipments operating nearby. The method in particular is applicable to a larger group of user equipments, in particular—but not necessary—installed by the same operator. With known device-to-device communication channels defined in LTE/New Radio the user equipments are capable of exchanging data without the deviation via the serving base station, in particular when operating in enhanced coverage.

Hence, the inventive method suggests for a data transmission from a first user equipment to the base station, when operating in coverage enhancement conditions, that at least one second user equipment is involved in the communication session.

For doing so, when the user equipment is about to send at least one data packet to the base station, it takes the step of transmitting the at least one data packet to the at least one second user equipment.

Additionally it instructs the at least one second user equipment to transmit the at least one data packet to the base station in that way, that it is time-synchronized with the data transmission of the first user equipment to the base station itself.

Time-synchronized means that all transmitted bits of the various streams arrive in a timing which is below the sampling rate, so that a decision making unit of the base station gets all positive energy of the various streams in the same sample. The decision making unit accumulates the energy and decides if sufficient energy is available for decoding. Such an approach can be performed by several user equipments in parallel where in a more advanced step also these group of user equipments can—in particular repeatedly—transmit the data package so that at the receiver of the base station the signals can be accumulated over time. Due to the fact that multiple-parallel repeated transmissions are less spread in time, the non-linear impact is far lower as if one user equipment would transmit said package over longer duration. The accumulated benefit is higher as the non-linear impact is lower. A combined multi device transmission bears many benefits with respect to circumventing negative impacts and occupying scarce network resources only for short time. The first and the at least one second user equipment then send the data packet according to the time-synchronization schedule.

Preferably additional data packets are exchanged and transmitted the same way.

The first user equipment preferably does not differ from the at least one second user equipment in terms of hardware equipment. Any of the group of user equipments being located in sufficient proximity may be in the same position of taking the role of the first user equipment.

Sufficient proximity in this sense means in the order of smallest time unit defined in LTE, Ts (time segment). Ts is defined exactly as:

$$Ts=1/(15000\times 2048) \text{ seconds, a little more than 32 nano-seconds.}$$

This equals to 9.6 meters when considering speed of light.

When calculated differently considering LTE maximum bandwidth with FFT size of 2048 in 20 MHz bandwidth the sampling rate is 30.72 MHz, means any signals arriving with less offset than the sampling rate will not be recognized as different but considered the same. For any smaller bandwidth the sampling rate is a corresponding fraction as having less subcarriers.

The symbol period is reciprocal of the sub-carrier spacing. So in case of LTE where 15 KHz is sub-carrier spacing the symbol length is 1/(15 KHz). 2048 time samples from IFFT module fit into symbol period of 1/(15 KHz). The sampling frequency hence is (15 KHz*2048) for 20 MHz.

Similarly by changing the number of sub-carriers one will get the sampling frequency for other bandwidths. However, considering a specific use case of a connected car, then the user equipments may be distributed within a car to overcome the outdoor/indoor attenuation of the car for user equipments, then said distances and accuracy requirements are easy full achievable.

In a more advanced approach the signals of the various user equipments could be recognized as different, i.e. multiple user equipments forming an orchestrated transmit-diversity emission. And the receiver may use feedback such as MIMO according to Alamouti's code to coordinate the timing in a learning phase which once derived can be used for any future transmissions accordingly. Such techniques are well known e.g. Alamouti.

However, here we have one user equipment forming an orchestrated/synchronized uplink (UL) transmission preferably by many user equipments. Preferably that user equipment of a group takes the role of being the first user equipment which is the originator of the data to be transmitted. E.g. when a measurement is carried out and supposed to be transmitted by a metering device, it takes the role of being the first user equipment.

This makes the inventive solution so flexible and automatically achieves a balancing of power consumption. The power consumption is still linear to the amount of data a user equipment produces and is supposed to transmit.

Instead of sending repetitively the same data packet by one user equipment with the inventive method the time for sending a data packet in enhanced coverage is massively reduced. Moreover the power consumption for one user equipment, in particular when operating in worse coverage conditions than the majority of other user equipments of the involved group, is reduced.

For initiating such a group transmission the orchestrating user equipment negotiates and allocates corresponding resources with the serving base station and indicates this to be a combined transmission. The resources granted for said approach will be sufficiently in the future for the user equipment in order to have enough time to orchestrate the transmission with the other user equipments, i.e. providing related timing and sequences to be used.

Before doing so preferably a few preparatory steps are supposed to be conducted.

According to a preferred embodiment it is proposed prior to transmitting the at least one data packet the step for the first user equipment of determining at least one second user equipment being capable of communicating over the device-to-device communication channel.

Before setting up the time-synchronized communication preferably the first user equipment determines which other user equipments are in proximity.

This step is preferably carried out once, in particular for stationary or other ways fixed installations. E.g. with two or more user equipments installed in a car, it is in a initialization step advantageous to determine which user equipments are in proximity. This is in particular carried out by one user equipment. Preferably each of the user equipments does this step.

For the case that another user equipment is put into proximity of the first user equipment it is however advantageous to at least occasionally carry out the steps of this embodiment in order to figure that out.

The determination step comprises in particular the steps of exchanging signals via the direct communication link between the user equipments i.e. the sidelink. The first user equipment, acting as the orchestrating or master user equipment can either use the PSBCH physical sidelink broadcast channel or the PSSCH the physical sidelink shared data channel. In general sufficient means are known from TS23.303 to communicate reliable via the sidelink and evaluate the proximity of the other user equipments.

In opposite to a pure relay of information towards other user equipments being in proximity to the master user equipment the information exchange in UL will be a combined transmission of the user equipments and not just only by the first resp. master user equipment. Once the master user equipment has negotiated with the base station concerning timing and format of an UL transmission and provided said information to the at least one second user equipment in proximity, a joint transmission of the in particular prior exchanged data packets (between the user equipments) is carried out. The transmission start and format provided by the base station and distributed by the master user equipment among the second user equipments is then consequently performed.

In another advantageous embodiment it is proposed prior to transmitting the at least one data packet to the base station the method comprises the step for the first user equipments of negotiating with the base station timing conditions for said transmission of the at least one data packet, and sharing said timing conditions with the at least one second user equipment via the device-to-device communication channel.

With this embodiment it is proposed for the first user equipment to exchange with the serving base station information relating to the envisaged distributed data transmission. This step is preferably carried out after the previous embodiment was carried out, resp. when it is known—e.g. from previous data transmissions—how many, and in particular which, second user equipments will be involved in the data transmission.

The step of negotiating in particular involves an exchange of messages relating to requirements of the user equipment for the envisaged data transmission and the available resources and timing constraints of the base station, and an exchange in terms of approval of at least one of the user equipment and the base station for the timing conditions.

The timing conditions relate to the start of the data transmission and has a direct influence on said time-synchronization of the data transmissions from the first and at least one second user equipment.

With this step it is assured that the at least one second user equipments does not have to take any additional steps as overhead in preparation of the data transmission of the at least one data packet. This is advantageous as in particular in the case of a low amount of data to be transmitted the gained advantage in terms of power saving would be in danger of being overcompensated through such individual signalling efforts for setting up the data connection.

With the proposed embodiment it is in the responsibility of the first user equipment to set up the data transmission session accordingly, and consequently also to invest efforts in order to have everything arranged before the at least one second user equipment assists in transmitting the data packet to the base station.

According to another preferred embodiment it is proposed that the first and the at least one second user equipment maintain a common group identifier, said group identifier is used as part of the negotiation with the base station and said group identifier is enclosed in said at least one data packet.

Group identifier could be transmitted, or alternatively already known by the base station. In opposite to existing multi-device group identifiers said group identifier for orchestrated transmission when used would change the corresponding procedures. This means in particular a data assignment from the base station for a group would be done at a later time instant than for a single user equipment, as information on timing when to be transmitted need to be shared from the master user equipment as negotiated with the base station with the other one or more user equipments of the group. I.e. in LTE uplink assignment is for 4 frames later, being sufficient for UE processing in normal single UE transmission. This is not sufficient for orchestrated transmission, hence the received data needs to be distributed via PC5 to the other UEs, which needs additional processing time, which needs to be taken into account during negotiation. This applies In particular, when the other user equipments are successively informed via sidelink by the master user equipment. Preferably the user equipment is capable of establishing more than one sidelink connection at a time, and hence distribute the timing information at least partly in parallel to the other user equipments.

This embodiment is in particular helpful when a user equipment of the same group also wants to transmit information i.e. taking over master role and reacquiring same conditions as negotiated for that group earlier.

With this embodiment it is assured that the mastership within the group can be changed or even when the same user equipment maintains the mastership, the group identifier can be used to acquire the corresponding service from the base station as a group whilst each user equipment can also maintain its individual identifier for any other communication purpose.

Additionally it is useful that a second user equipment which gets a request from a first user equipment, that is having the master role, is capable to reject the request. This is in particular carried out in case the second user equipment is already active in a predetermined number of groups. Preferably a user equipment can serve one master user equipment, and all additional requests are then consequently rejected.

For this the group identifier is also helpful for the second user equipment to decide if the additional transmission is rejected or not. If the second user equipment is already active in a group, then it will continue transmitting data packets, when the mastership has changed among other group members. However, with the time-synchronized measurement there is still the risk that data packets are not transmitted that well synchronized that the base station can well aggregate the received signals for decoding the data packet. In particular when a plurality of data packets are transmitted, for the later transmitted packages the synchronization, in particular in case of many involved user equipments, might get lost.

It is therefore suggested according to another preferred embodiment that in case at least one of the first and second user equipments receives an indication from the base station about imbalance of synchronization, the method comprises the steps for the first user equipment of:

indicating to the at least one second user equipment to stall data transmission, carrying out corresponding synchronization improvement measures, re-negotiating with the base station timing conditions for said transmission, sharing said timing conditions with the at least one second user equipment via the device-to-device communication channel, continuing transmission according to new timing conditions.

This embodiment gets triggered by an indication received at the first or at least one second user equipment from the base station that indicates an imbalance in synchronization. This is in particular provided by means of a message from the base station to the respective user equipment.

Preferably such indication is sent to the first user equipment, which can then take steps for resolving the situation. This is the master user equipment of the current communication session.

However, also the indication may be received by one of the second user equipments. In that case it is suggested to submit via the established device-to-device communication that indication to the user equipment in order to have it taking the necessary steps.

The necessary steps involve sending an instruction to the at least one second user equipment by means of the device-to-device communication channel to stall the data transmission, that means to discontinue transmitting for the time being. The first user equipment consequently stalls the data transmission as well.

The first user equipment is then supposed to carry out synchronization improvement measures, if applicable. This step preferably involves checking if at least one of the second user equipment does not provide enough synchronization stability. This may in particular take into account imbalance situation that happened previously, advantageously when caused by the same user equipment.

Then it is advantageous to remove that user equipment from the group of second user equipments and to continue the transmission.

Further an adjustment of the time-synchronization between the user equipments is preferably carried out.

When the improvement measures are conducted, the first user equipment again negotiation timing conditions with the base station, distributes them among the second user equipments via device-to-device communication channel and eventually—involving the first and at least one second user equipment—continuing the transmission of the data packets following the newly negotiated timing conditions and taking into account the improvement measures.

According to another preferred embodiment it is propose that the timing conditions comprise to repeat sending the data packet for at least a subset of the first and at least one second user equipment, in relation to applicable enhanced coverage conditions.

With this embodiment an optimization is introduced for the case that it is figured out that the required repetitions for safely transmitting a data packet to the base station does not match to the available number of involved first and second user equipments.

If 10 repetitions are needed and 10 user equipments are available, the transmission will with high likelihood be successful.

If 10 repetitions are needed and 11 or more user equipments are available, preferably only 10 of the available user equipments are involved in sending the data packet to the base station. This is in particular advantageous for the case that one of the 10 base stations is not reliable enough, e.g. in terms of synchronization stability. This could then be exchanged.

To use as much user equipments as available, even if not needed, would from the power budget not be recommended.

Preferably the user equipments with worse coverage conditions, e.g. with the highest CE level, would be avoided.

In case 10 repetitions are needed and only 6 user equipments are available, according to the preferred embodiment 4 of the 6 user equipments are supposed to transmit the data packet twice. This is in particular part of the time-synchronization.

For simplicity reasons and in order to avoid organizational overhead it may be advantageous to have all user equipments transmit twice, resp. as long as it is needed in order to assure enough available repetitions at the base station for decoding the data packet.

However it is preferable if only as much repetitions are done as it is needed. This means that some user equipments may transmit data packets at least one time more than another user equipment of the group of involved user equipments. Preferably the user equipments in better coverage conditions repeat the transmission, rather than those with bad coverage conditions.

As the proposed inventive method does not require that the user equipments are known to each other, but may be owned by different subscribers, also the factor of data security is relevant.

Hence it is suggested in another advantageous embodiment, that the first user equipment is maintaining at least one content package, wherein prior to transmitting the at least one data packet the method comprises the step of: encrypting the at least one content package and distributing the result of the encryption on the at least one data packet.

The encryption carried out at the first user equipment or an application communicatively coupled to it assures that the second user equipments do not have the chance to evaluate what kind of data are transmitted with the help of at least one second user equipment. This increases the amount of user equipments that can safely be used immensely.

When prior to such data transmission it is necessary to exchange keys or certificates for the base station, resp. the targeted remote server, it is preferably setup a data transmission without involvement of other user equipment. This may take a while, as common enhanced coverage data transmission needs probably to take place.

When this step is done, then the encrypted content packages may be shared as data packets with at least one second user equipment for transmitting to the user equipment.

According to the second aspect of the invention it is proposed a user equipment for operating in a cellular network by means of one of a plurality of base station of the cellular network, configured to camp on the base station under coverage enhancement conditions, and communicatively connected to at least one second user equipment via a device-to-device communication channel, wherein for data transmission of at least one data packet the user equipment is configured to:

transmit the at least one data packet to the at least one second user equipment via the device-to-device communication channel, instruct the at least one second user equipment to transmit the at least one data packet time-synchronized with a first data transmission from the first user equipment to the base station.

The user equipment provides a couple of components for conducting wireless communication. This comprises at least processing circuitry for executing operation software, in particular those implementing the method of the first aspect of the invention.

Further the user equipment comprises transmitting and receiving circuitry in connection with at least one antenna, typically a transceiver for exchanging wireless communication signals with a base station of the cellular network. Further a memory unit for volatile and/or permanent storage of executable software, configuration data and measured data e.g. before receiving the transmission from the serving base station are preferably comprised in the user equipment.

The second aspect of the invention shares the advantages of the first aspect of the invention.

According to the third aspect of the invention it is proposed a method for a base station of a cellular network, configured to communicate with a plurality of user equipments in simultaneous reception mode, the method comprising the steps of:

receiving from at least two user equipments transmission signals relating to identical data packets of each of the at least two user equipments, combining the received transmission signals, in case the combination of signals leads to sufficiently decodable signals, decoding the combined signals.

This aspect of the invention relates to the base station as counterpart on the air interface for a user equipment according to the second aspect of the invention for reaching the addressed problem. Hence, for solving the addressed problem it is expected that also the base station supports the user equipment in its effort.

The base station is one of a plurality of base station of the cellular network, and configured to implement the technology standard of 4G or 5G. In 4G base stations are typically called eNodeB, in 5G they are called gNodeB.

Further the base station is capable of operating in enhanced coverage mode, at least in uplink.

The base station is consequently capable of accumulating signals received within a technically predetermined time distance resp. jitter.

According to the method the base station receives after negotiating with a first user equipment according to the second aspect of the invention the timing conditions transmission signals from at least two user equipments. then it combines the received signals until they are decodable.

The base station in particular comprises a decision making unit for getting the energy from the various streams provided preferably in the middle of the chip, and accumulates it to receive sufficient energy for decoding.

It may be the case that the method needs to be repeated at least once in order to gain sufficient power for successfully decoding the data packet which was transmitted with the plurality of transmissions.

In a preferred embodiment it is further proposed that prior to receiving the transmission signals the steps of receiving a request for negotiation of timing conditions for a data transmission from one of the at least two user equipments, and transmitting as part of that negotiation an indication for timing conditions of the transmission to said user equipment.

This embodiment relates to the preparatory steps of setting up said data transmission session. As part of that it is foreseen that the base station receives a request for an orchestrated communication session, preferably by submitting an transmission comprising an indication relating to the group identifier.

The base station then figures out the available resources and adds some additional time for the timing conditions, it is able to cope with.

These timing conditions are exchanged as part of the negotiation procedure.

Typically both the user equipment and the base station submit a preferred time schedule, or at least some corner stones which leads to a decision on timing conditions and/or resource allocation.

Typically the last decision is on the base station side, as it can view the available resources at a time.

In another preferred embodiment it is further proposed upon detection of a group identifier within the request of negotiating timing conditions the step of assigning resources for uplink transmission to a later point in time compared to a request comprising an identifier individually valid for a requesting user equipment.

According to this embodiment it is proposed that the base station detects the indication relating to a group identifier in the request from the user equipment. If this is the case, the base station is preferably aware that the request is related to an orchestrated data transmission session. Hence it is necessary that on the user equipment side some additional time for coordinating with the other—second—user equipments is required. This needs to be taken into account by the base station.

The amount of additional time is preferably indicated by the user equipment, e.g. based on previously carried out coordination tasks with the second user equipments. Preferably the number of user equipments used for transmitting the envisaged data packets influences the necessary additional time. As this is typically only known to the master user equipment, it is preferably considered for the step of negotiating the timing conditions.

If only an identifier indicating an individual user equipment is detected by the base station, no such additional timing is needed.

Hence as part of the negotiation this timing delay is added to the timing conditions for the user equipment.

According to the fourth aspect of the invention it is proposed a base station of a cellular network, configured to communicate with a plurality of user equipments in simultaneous reception mode, being configured to:

receive from at least two user equipments transmission signals relating to identical data packets of each of the at least two user equipments, combine the received transmission signals, in case the combination of signals leads to sufficiently decodable signals, decode the combined signals.

The fourth aspect of the invention shares the advantages of the third aspect.

As it is shown this invention advantageously solves the depicted problem and proposes an innovative way of avoiding power consumption intensive data transmissions for user equipments operating in bad coverage situations, but with other user equipments in proximity.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a first user equipments UE1 of the type to which the present invention is applied as an embodiment in conjunction with two more user equipments UE2, UE3 arranged as a group of user equipments.

The user equipments of said group are in particular in this exemplifying embodiment installed on a car CA, like for different mobility units.

Each user equipment comprises transmitting and receiving circuitry, in particular a transceiver and has access to one or more antennas. Preferably the antennas are in this example provided by the car, that in particular means shared among at least two user equipments. Different user equipments in a car might be part of a eCall-Box, an entertainment unit, and e.g. a mobile handset. Only for illustration purposes the different user equipments are shown as if they were mobile handsets.

Further the user equipments comprise processing circuitry like a CPU for executing software, in particular protocol stack software for conducting standard compliant communication tasks. Such tasks involve communication over the air interface with at least one base station BS of a cellular network CN.

The base station BS implements at least one wireless cellular communication standard, in particular 3G (UMTS/CDMA), 4G (LTE), 5G (New Radio NR) or beyond. For that it comprises transmitting and receiving means, in particular an antenna and a transceiver. Further it provides access to cellular network components, in particular the radio access network and/or indirectly the core network.

Further the user equipments UE1, UE2, UE3 are configured to carry out device-to-device D2D communication among the user equipments, without involving a base station. Such D2D communication is in particular carried out by means of PC5/sidelink resp. ProSe functionality as standardised for 4G and later. With that the user equipments can exchange signals among each other, which is in particular from the power consumption advantageous compared to a signalling through the base station BS.

The user equipments UE1, UE2, UE3 are configured to operate with the base station in enhanced coverage mode CE for overcoming bad coverage conditions. Consequently the serving base station needs to be capable of serving user equipments in enhanced coverage mode as well.

With the cell area 1 CEA1 it is indicated in which area user equipments can camp without severe service degradations on said base station BS, when operating in normal coverage mode. However cell area 2 CEA2 shows the area where user equipments operating in enhanced coverage mode can be served by the base station BS.

Figure 1:
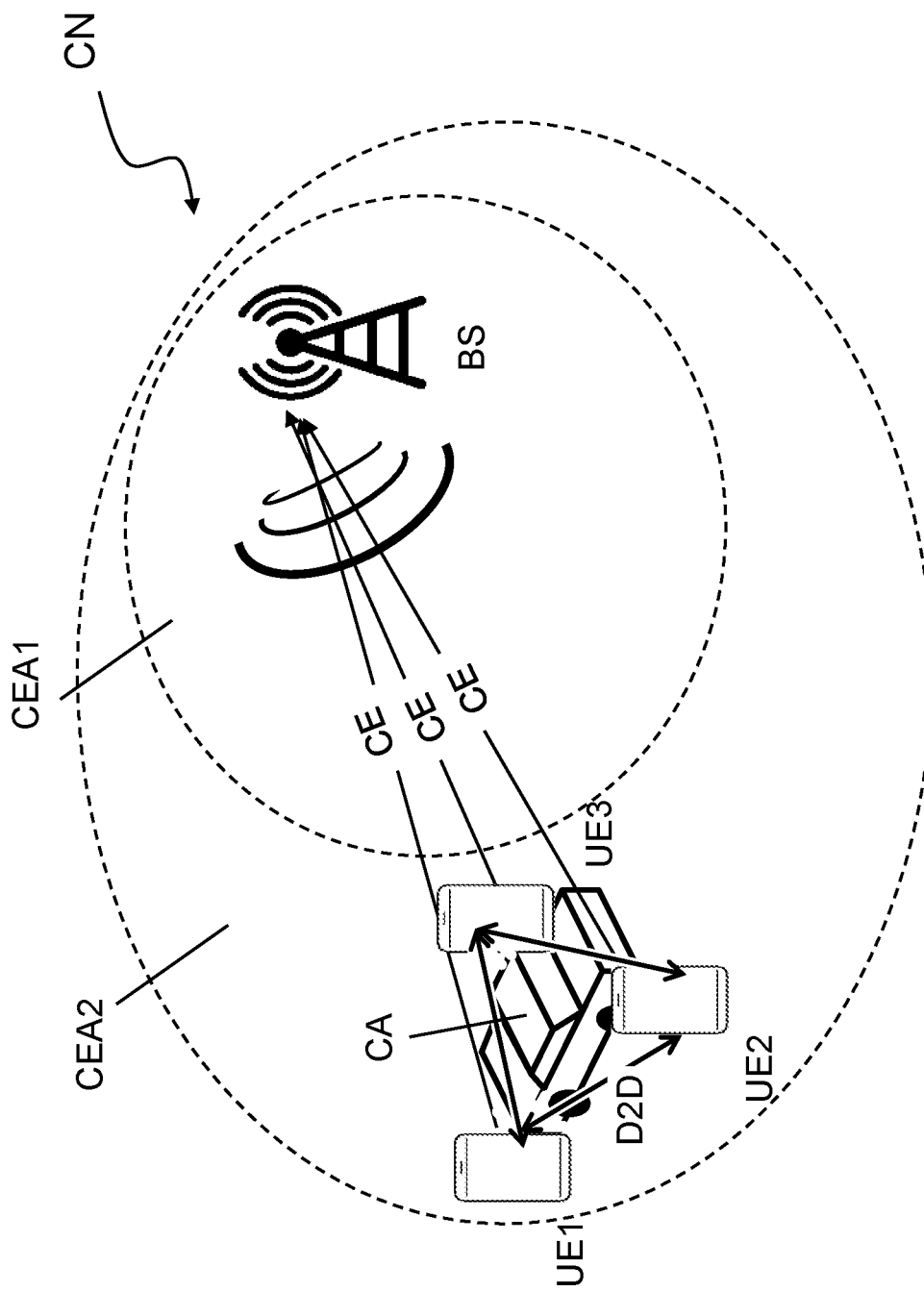
FIG. 1 represents a group of user equipments of the type to which the present invention is applied as an embodiment.

As the coverage enhancement level resp. the number of repetitions is mainly governed by the coverage conditions, in particular distance from the base station, obstacles etc., it may be that a car parking in a no coverage area, or a parking garage, the user equipments provide different coverage enhancement levels. Hence it is—based on how the car is parked—either the one or the other user equipment which has better coverage conditions than the others. In the exemplifying embodiment of FIG. 1 the user equipment UE3 is situated closer to the base station BS than the other user equipments UE1, UE2. For this situation it would be preferable, if user equipment UE3 transmits signals to the base station, instead of the other two user equipments.

Alternatively the user equipment which produced the information, e.g. petrol usage, mileage or a check if maintenance events, map updates etc. are available.

Figure 2:
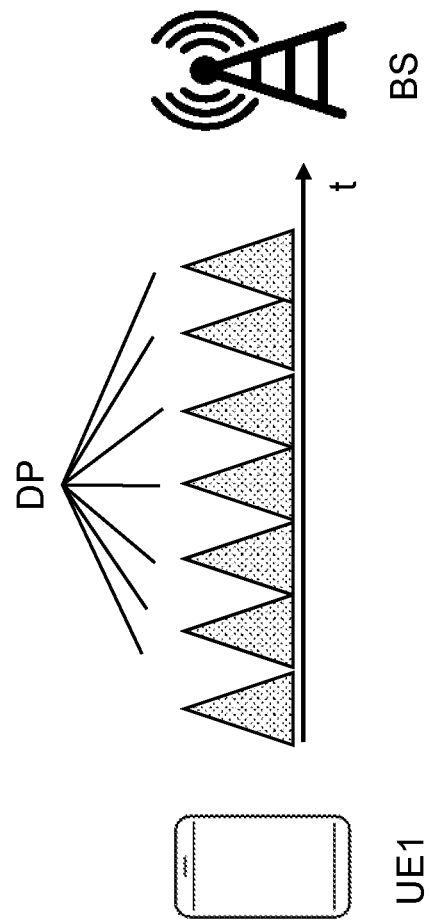
FIG. 2 shows the data transmission of user equipments where present invention is applied to in coverage enhancement conditions according to the prior art.

In FIG. 2 the transmission of a data packet DP from a user equipment UE1 to a base station BS in enhanced coverage mode CE is schematically shown on a time bar, as it is known from the prior art.

It can be seen that the data packet is sent without any change a couple of times successively to the base station BS. Obviously this leads to an immense reduction of the data transfer rate. The more often the data packet needs to be repeated, the longer it takes to transmit one data packet, and the less data packets for a given time period can be transmitted.

Figure 3:
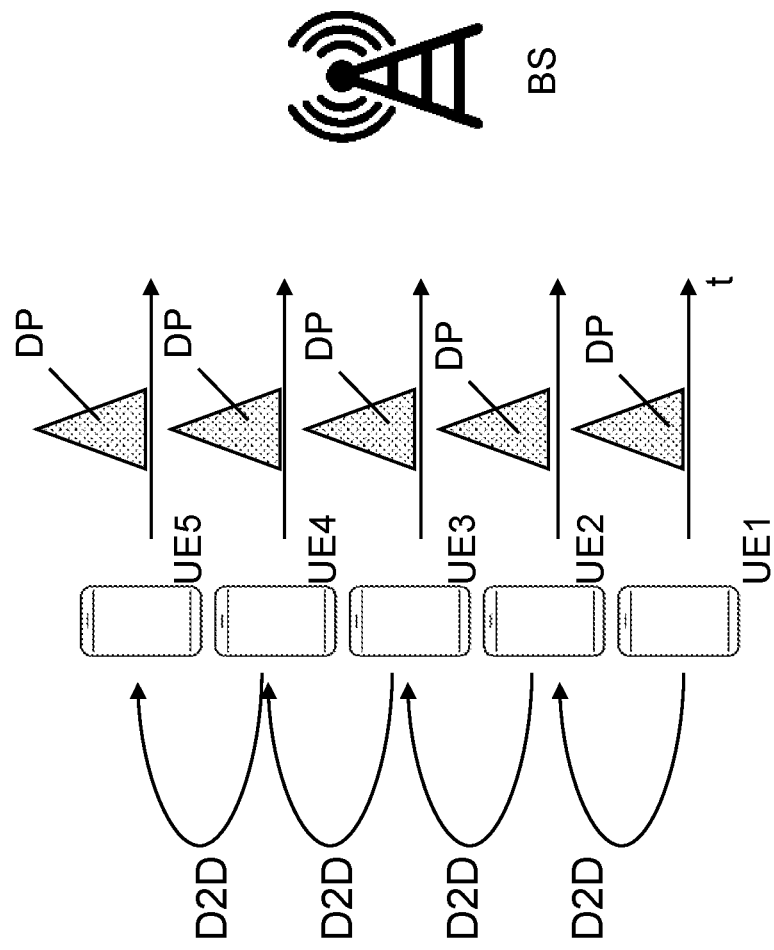
FIG. 3 displays as a first exemplifying embodiment of the invention the transmission of a data packet.

This is tried to be overcome with the inventive method, for which in FIG. 3 an exemplifying embodiment is shown. Here a group of user equipments UE1-UE5 are situated close together and is camping on the same base station BS.

The user equipments are interconnected by device-to-device connections D2D, in particular PC5/sidelink. Through these device-to-device connections before sending a data packet the user equipment which desires to send the data packet DP can share the data packet with the other user equipments UE2-UE5.

In this example the data packet is transmitted through connections from UE1 to UE2, UE2 to UE3 and so on. This is not necessarily the only way of exchange. Instead one user equipment UE1 might transmit the data packet DP to more than one other user equipment UE2, UE3. This preferably is arranged thanks to the local topology of connections among the user equipments of the group.

If the user equipments are part of a car, then device-to-device connections might anyhow be established between some of them. In particular in this context even wired connections between the user equipments are considered by the invention.

Hence such established connections are preferably chosen for distributing the data packet before sending it to the base station BS.

Additionally the user equipments needs to be instructed regarding the synchronisation of transmitting the data packet. With that all involved user equipments are ready to transmit the data packet DP time synchronized to the base station BS.

It is obvious that by this the time for sending a data packet in enhanced coverage is massively reduced.

Figure 4:
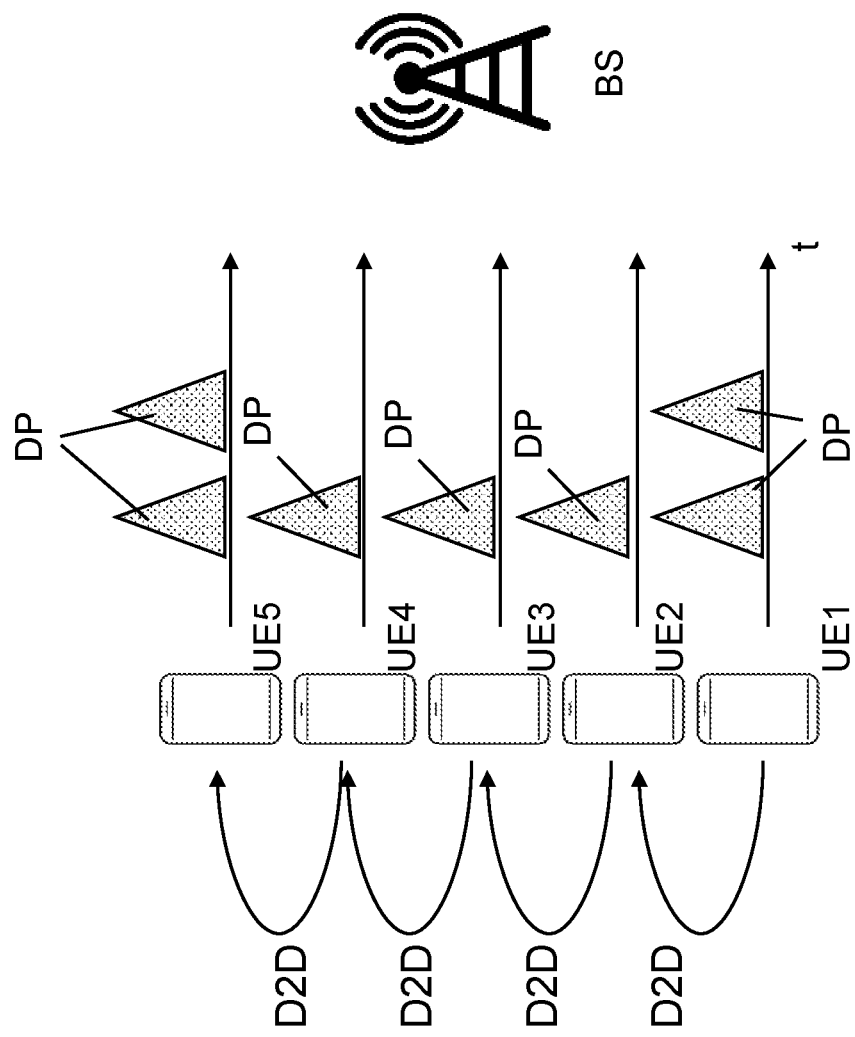
FIG. 4 displays as a second exemplifying embodiment of the invention the transmission of a data packet in deeper coverage enhancement conditions.

Should the number of user equipment does not comply with the number of repetitions needed to successfully transmit the data packet to the base station, then further repetitions are needed. However it is obvious that with the five user equipment as shown here, the data packet is transmitted 5 times faster than when under the same conditions only one user equipment would send the data packet. This applies regardless if 5 or 500 repetitions are needed. As it is shown in FIG. 4 it is additionally preferably if not all user equipment transmit the data packet as often as other user equipments of the same group of user equipments.

This is shown in this example, where 7 repetitions were needed in order to successfully transmit the data packet to the base station BS. As only 5 user equipments were available, it is advantageous if only that many transmissions are conducted as really needed. This helps the user equipments UE2, UE3, UE4, which do not have to make the second transmission, to save power.

The selection of which user equipments will send or will not send in such situation is in particular driven by the battery power, coverage conditions or reliability in terms of synchronization stability.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for data transmission from a first user equipment to a base station of a cellular network, the method comprising, by the first user equipment:
   transmitting at least one data packet to at least one second user equipment via a device-to-device communication channel;
   instructing the at least one second user equipment to transmit the at least one data packet to the base station time-synchronized with transmission of the at least one data packet by the first user equipment to the base station such that signals related to transmission of the at least one data packet by the first user equipment and the at least one second user equipment are recognized by the base station as a transmit-diversity emission;
   transmitting the at least one data packet to the base station time-synchronized with transmission of the at least one data packet by the at least one second user equipment to the base station;
   receiving from the base station an indication about an imbalance of time synchronization between transmission of the at least one data packet to the base station by the first user equipment and transmission of the at least one data packet to the base station by the at least one second user equipment; and
   upon receipt of the indication:
   stalling the transmission of the at least one data packet to the base station;
   indicating the at least one second user equipment to stall the transmission of the at least one data packet to the base station;
   carrying out time synchronization improvement measures between the first user equipment and the at least one second user equipment;
   re-negotiating with the base station a new timing conditions for the transmission of the at least one data packet, the new timing conditions comprise a time for starting the transmission of the at least one data packet to the base station;
   sharing the new timing conditions with the at least one second user equipment via the device-to-device communication channel;
   instructing the at least one second user equipment to continue the transmission of the at least one data packet to the base station time-synchronized with the transmission of the at least one data packet by the first user equipment to the base station according to the new timing conditions; and
   continuing the transmission of the at least one data packet to the base station time-synchronized with the transmission of the at least one data packet by the at least one second user equipment to the base station according to the new timing conditions;
   wherein the first user equipment and the at least one second user equipment camp on the base station under coverage enhancement conditions.

2. The method according to claim 1, comprising: prior to transmitting the at least one data packet, determining that the at least one second user equipment is capable of communicating over the device-to-device communication channel.

3. The method according to claim 1, wherein prior to transmitting the at least one data packet to the base station, the method comprises:
   negotiating with the base station a timing conditions for said transmission of the at least one data packet, and
   sharing said timing conditions with the at least one second user equipment via the device-to-device communication channel.

4. The method according to claim 3, wherein the first user equipment and the at least one second user equipment maintain a common group identifier, wherein said group identifier is used as part of a negotiation with the base station, and wherein said group identifier is enclosed in said at least one data packet.

5. The method according to claim 1, wherein comprising: repeating sending the data packet by at least one of the first user equipment and the at least one second user equipment in relation to the coverage enhancement conditions.

6. A first user equipment for operating in a cellular network by means of a base station of the cellular network, the first user equipment is configured to:
   transmit at least one data packet to at least one second user equipment via a device-to-device communication channel;
   instruct the at least one second user equipment to transmit the at least one data packet to the base station time-synchronized with transmission of the at least one data packet by the first user equipment to the base station such that signals related to transmission of the at least one data packet transmitted by the first user equipment and the at least one second user equipment are recognized by the base station as a transmit-diversity emission;
   transmit the at least one data packet to the base station time-synchronized with transmission of the at least one data packet by the at least one second user equipment to the base station;
   receive from the base station an indication about an imbalance of time synchronization between transmission of the at least one data packet to the base station by the first user equipment and transmission of the at least one data packet to the base station by the at least one second user equipment; and upon receipt of the indication:
stall the transmission of the at least one data packet to the base station;
indicate the at least one second user equipment to stall the transmission of the at least one data packet to the base station;
carry out time synchronization improvement measures between the first user equipment and the at least one second user equipment:
re-negotiate with the base station a new timing conditions for the transmission of the at least one data packet, the new timing conditions comprise a time for starting the transmission of the at least one data packet to the base station:
share the new timing conditions with the at least one second user equipment via the device-to-device communication channel;
instruct the at least one second user equipment to continue the transmission of the at least one data packet to the base station time-synchronized with the transmission of the at least one data packet by the first user equipment to the base station according to the new timing conditions; and
continue the transmission of the at least one data packet to the base station time-synchronized with the transmission of the at least one data packet by the at least one second user equipment to the base station according to the new timing conditions;
wherein the first user equipment and the at least one second user equipment camp on the base station under coverage enhancement conditions.

7. The first user equipment according to claim 6, configured to:
negotiate with the base station a timing conditions for said transmission of the at least one data packet prior to transmitting the at least one data packet to the base station, and
share said timing conditions with the at least one second user equipment via the device-to-device communication channel.

8. A method for a base station of a cellular network, configured to communicate with a plurality of user equipments in simultaneous reception mode, the method comprising:
receiving from at least two user equipments transmission signals relating to identical at least one data packet of each of the at least two user equipments,
combining the received transmission signals, and
in case the combination of signals leads to sufficiently decodable signals, decoding the combined signals; and
upon detection of an imbalance of a time synchronization between the transmission signals from the at least two user equipments, sending an indication about the imbalance of the time synchronization to at least one of the at least two user equipments;
wherein the at least two user equipments are communicatively connected to each other via a device-to-device communication channel;
wherein the at least two user equipments camp on the base station under coverage enhancement conditions; and
wherein upon receipt of the indication, a first user equipment of the at least two user equipments is configured to:
stall transmission of the at least one data packet to the base station;
indicate at least one second user equipment of the at least two user equipments to stall transmission of the at least one data packet to the base station;
carry out time synchronization improvement measures between the first user equipment and the at least one second user equipment;
re-negotiate with the base station a new timing conditions for the transmission of the at least one data packet, the new timing conditions comprise a time for starting the transmission of the at least one data packet to the base station;
share the new timing conditions with the at least one second user equipment via the device-to-device communication channel;
instruct the at least one second user equipment to continue the transmission of the at least one data packet to the base station time-synchronized with the transmission of the at least one data packet by the first user equipment to the base station according to the new timing conditions such that signals related to transmission of the at least one data packet by the first user equipment and the at least one second user equipment are recognized by the base station as a transmit-diversity emission; and
continue the transmission of the at least one data packet to the base station time-synchronized with the transmission of the at least one data packet by the at least one second user equipment to the base station according to the new timing conditions.

9. The method according to claim 8, further comprising:
prior to receiving the transmission signals, receiving a request for a negotiation of a timing conditions for a data transmission from one of the at least two user equipments, and
transmitting as part of that negotiation an indication for the timing conditions of the data transmission to said user equipment.

10. The method according to claim 9, further comprising: upon detection of a group identifier within the request of negotiating of the timing conditions, assigning resources for uplink transmission to a later point in time compared to a request comprising an identifier individually valid for a requesting user equipment.

11. A base station of a cellular network, configured to communicate with a plurality of user equipments in simultaneous reception mode, the base station configured to:
receive from at least two user equipments transmission signals relating to identical at least one data packet of each of the at least two user equipments,
combine the received transmission signals, and
in case the combination of signals leads to sufficiently decodable signals, decode the combined signals; and
upon detection of an imbalance of a time synchronization between the transmission signals from the at least two user equipments, sending an indication about the imbalance of the time synchronization to at least one of the at least two user equipments;
wherein the at least two user equipments are communicatively connected to each other via a device-to-device communication channel;
wherein the at least two user equipments camp on the base station under coverage enhancement conditions; and
wherein upon receipt of the indication, a first user equipment of the at least two user equipments is configured to:
stall transmission of the at least one data packet to the base station;

indicate at least one second user equipment of the at least two user equipments to stall transmission of the at least one data packet to the base station;

carry out time synchronization improvement measures between the first user equipment and the at least one second user equipment;

re-negotiate with the base station a new timing conditions for the transmission of the at least one data packet, the new timing conditions comprise a time for starting the transmission of the at least one data packet to the base station;

share the new timing conditions with the at least one second user equipment via the device-to-device communication channel;

instruct the at least one second user equipment to continue the transmission of the at least one data packet to the base station time-synchronized with the transmission of the at least one data packet by the first user equipment to the base station according to the new timing conditions such that signals related to transmission of the at least one data packet by the first user equipment and the at least one second user equipment arrive are recognized by the base station as a transmit-diversity emission; and continue the transmission of the at least one data packet to the base station time-synchronized with the transmission of the at least one data packet by the at least one second user equipment to the base station according to the new timing conditions.

* * * * *